United States Patent
Kelly et al.

(10) Patent No.: US 8,432,108 B2
(45) Date of Patent: Apr. 30, 2013

(54) SOLID STATE LIGHTING, DRIVER CIRCUITS, AND RELATED SOFTWARE

(75) Inventors: Kevin Allan Kelly, Hilliard, OH (US); John D. Boyer, Lebanon, OH (US); Martin Brundage, Columbus, OH (US)

(73) Assignee: LSI Industries, Inc., Cincinnati, OH (US)

(*) Notice: Subject to any disclaimer, the term of this patent is extended or adjusted under 35 U.S.C. 154(b) by 650 days.

(21) Appl. No.: 12/582,654

(22) Filed: Oct. 20, 2009

(65) Prior Publication Data

US 2010/0117545 A1 May 13, 2010

Related U.S. Application Data

(63) Continuation-in-part of application No. 12/112,101, filed on Apr. 30, 2008, now Pat. No. 7,952,293.

(51) Int. Cl.
| | |
|---|---|
| G05F 1/00 | (2006.01) |
| H05B 37/02 | (2006.01) |
| H05B 39/04 | (2006.01) |
| H05B 41/36 | (2006.01) |
| H05B 37/00 | (2006.01) |
| H05B 39/00 | (2006.01) |
| H05B 41/14 | (2006.01) |
| H05B 41/00 | (2006.01) |

(52) U.S. Cl.
USPC ........... 315/297; 315/201; 315/210; 315/247; 315/312

(58) Field of Classification Search ........................ None
See application file for complete search history.

(56) References Cited

U.S. PATENT DOCUMENTS

| | | | |
|---|---|---|---|
| 3,890,537 A | 6/1975 | Park et al. | |
| 5,247,268 A | 9/1993 | Meise | |
| 5,440,357 A | 8/1995 | Quaglia | |
| 5,568,041 A | 10/1996 | Hesterman | |
| 5,612,597 A | 3/1997 | Wood | |

(Continued)

FOREIGN PATENT DOCUMENTS

| | | |
|---|---|---|
| EP | 1643810 A1 | 4/2006 |
| JP | 54103278 | 8/1979 |

(Continued)

OTHER PUBLICATIONS

European Search Report dated Jun. 6, 2011 from corresponding European Application No. 11002190.4.

(Continued)

*Primary Examiner* — Douglas W Owens
*Assistant Examiner* — Dedei K Hammond
(74) *Attorney, Agent, or Firm* — McDermott Will & Emery LLP

(57) ABSTRACT

LED lighting fixtures, or luminaires, related components, driver circuit, methods, and software/firmware are described that can provide for among other things, ambient environment sensing, thermal self-monitoring, sensor-based power management, communications, and/or programmability. Driver and lighting circuits configured for electrical loads such as series arrangements of light emitting diodes are also described. Embodiments of PFC stages and driver stages can be combined for use as a power supply, and may be configured on a common circuit board. Power factor correction and driver circuits can be combined with one or more lighting elements as a lighting apparatus. Methods of hysteretic power factor correction start-up are also described.

12 Claims, 9 Drawing Sheets

U.S. PATENT DOCUMENTS

| | | | |
|---|---|---|---|
| 5,650,668 A | 7/1997 | Hellman et al. | |
| 5,661,645 A | 8/1997 | Hochstein | |
| 5,754,419 A | 5/1998 | Ho | |
| 5,869,937 A * | 2/1999 | Konopka | 315/291 |
| 5,980,064 A | 11/1999 | Metroyanis | |
| 5,982,639 A * | 11/1999 | Balakirshnan | 363/21.18 |
| 5,986,901 A | 11/1999 | Weng | |
| 5,999,433 A | 12/1999 | Hua et al. | |
| 6,028,776 A | 2/2000 | Ji et al. | |
| 6,124,681 A | 9/2000 | Choi | |
| 6,150,771 A | 11/2000 | Perry | |
| 6,400,101 B1 | 6/2002 | Biebl et al. | |
| 6,465,990 B2 | 10/2002 | Acatrinei et al. | |
| 6,617,805 B2 | 9/2003 | Ribarich et al. | |
| 6,870,328 B2 | 3/2005 | Tanabe et al. | |
| 6,922,024 B2 * | 7/2005 | Yano et al. | 315/291 |
| 6,989,807 B2 | 1/2006 | Chiang | |
| 7,054,760 B2 | 5/2006 | Youngquist | |
| 7,091,671 B2 | 8/2006 | Deurloo et al. | |
| 7,187,136 B2 | 3/2007 | Fiorello | |
| 7,256,554 B2 | 8/2007 | Lys | |
| 7,262,559 B2 | 8/2007 | Tripathi et al. | |
| 7,274,648 B2 | 9/2007 | Tanase | |
| 7,276,861 B1 | 10/2007 | Shteynberg et al. | |
| 7,279,868 B2 | 10/2007 | Lanni | |
| 7,332,871 B2 | 2/2008 | Lu | |
| 7,348,735 B2 | 3/2008 | Lestician | |
| 7,358,706 B2 | 4/2008 | Lys | |
| 7,378,805 B2 | 5/2008 | Oh et al. | |
| 7,402,960 B2 | 7/2008 | Kajita | |
| 7,501,772 B2 | 3/2009 | Chung et al. | |
| 7,511,437 B2 | 3/2009 | Lys et al. | |
| 7,528,551 B2 | 5/2009 | Ball | |
| 7,570,235 B2 | 8/2009 | Shaanan et al. | |
| 7,609,008 B1 | 10/2009 | Kohler | |
| 7,719,246 B2 | 5/2010 | Melanson | |
| 2003/0209997 A1 | 11/2003 | St-Germain et al. | |
| 2004/0181358 A1 | 9/2004 | Youngquist | |
| 2004/0233145 A1 | 11/2004 | Chiang | |
| 2005/0057179 A1 | 3/2005 | Madhani et al. | |
| 2005/0110469 A1 | 5/2005 | Inaba et al. | |
| 2005/0190586 A1 | 9/2005 | Radzinski et al. | |
| 2005/0219872 A1 | 10/2005 | Lys | |
| 2005/0225259 A1 | 10/2005 | Green | |
| 2005/0231133 A1 | 10/2005 | Lys | |
| 2005/0270770 A1 | 12/2005 | Warrender et al. | |
| 2006/0071614 A1 | 4/2006 | Tripathi et al. | |
| 2006/0214603 A1 | 9/2006 | Oh et al. | |
| 2006/0284845 A1 | 12/2006 | Wu et al. | |
| 2007/0024213 A1 | 2/2007 | Shteynberg et al. | |
| 2007/0057642 A1 | 3/2007 | Pruett | |
| 2007/0108916 A1 | 5/2007 | Wang et al. | |
| 2007/0152604 A1 | 7/2007 | Tatsumi | |
| 2007/0159736 A1 | 7/2007 | Kajita | |
| 2007/0188114 A1 | 8/2007 | Lys et al. | |
| 2007/0188457 A1 | 8/2007 | Wu et al. | |
| 2007/0195532 A1 | 8/2007 | Reisenauer et al. | |
| 2007/0285030 A1 | 12/2007 | Okamoto et al. | |
| 2008/0018261 A1 * | 1/2008 | Kastner | 315/192 |
| 2008/0093999 A1 | 4/2008 | Cheng et al. | |
| 2008/0157686 A1 | 7/2008 | Chung et al. | |
| 2008/0203932 A1 | 8/2008 | Ball | |
| 2008/0224629 A1 | 9/2008 | Melanson | |
| 2008/0224636 A1 | 9/2008 | Melanson | |
| 2008/0258551 A1 * | 10/2008 | Chitta et al. | 307/3 |
| 2008/0278086 A1 * | 11/2008 | Chitta et al. | 315/224 |
| 2008/0278092 A1 | 11/2008 | Lys et al. | |
| 2009/0045788 A1 * | 2/2009 | Williams et al. | 323/273 |
| 2009/0051296 A1 | 2/2009 | Ball | |
| 2009/0146575 A1 | 6/2009 | Chu et al. | |

FOREIGN PATENT DOCUMENTS

| | | |
|---|---|---|
| JP | 2000-224847 | 8/2000 |
| JP | 2002-315342 | 10/2002 |
| JP | 2007-503357 | 2/2007 |
| JP | 2007-188692 | 7/2007 |
| WO | WO 01/48495 | 7/2001 |
| WO | WO 2005/022596 | 3/2005 |

OTHER PUBLICATIONS

International Search Report and the Written Opinion from corresponding PCT/US2010/049769 dated Jan. 31, 2012.

Office Action dated Dec. 8, 2010 from Corresponding Australian Application No. 2009242665.

NCP1606 Cost Effective Power Factor Controller, Semiconductor Components Industries, LLC, Jun. 2007, Rev. 4, http://onsemi.com, 22 pages.

Schematic for the NCP1606B BOOST Evaluation Board, ON Semiconductor, Feb. 2, 2007, 1 page.

160W PFC Evaluation Board with DCM PFC controller TDA4863-2 and CoolMOS SPP08N50C3, Power Management & Supply, Application Note Version 1.0, Infineon Technologies, 24 pages Apr. 2004.

L6562-80W high performance transition mode PFC evaluation board, www.st.com, 6 pages, Nov. 2006.

Supertex, Inc., Universal High Brightness LED Driver, www.supertex.com, 8 pages.

TL331 Singe Differential Comparatr, SLVS238E, Aug. 1999, revised Sep. 2004, Texas Instruments, 9 pages.

TL431, TL431A, TL431B, TL432, TL432A, TL432B Adjustable Precision Shunt Regulators, SLVS543J, Aug. 2004—revised Dec. 2005, Texas Instruments, 68 pages.

Invitational to Pay Additional Fees and, Where Applicable, Protest Fee, dated Sep. 21, 2009, (4 pages).

Notification of Transmittal of the International Search Report and the Written Opinion of the International Searching Authority from related PCT Application No. PCT/US2009/042368 (18 pages).

* cited by examiner

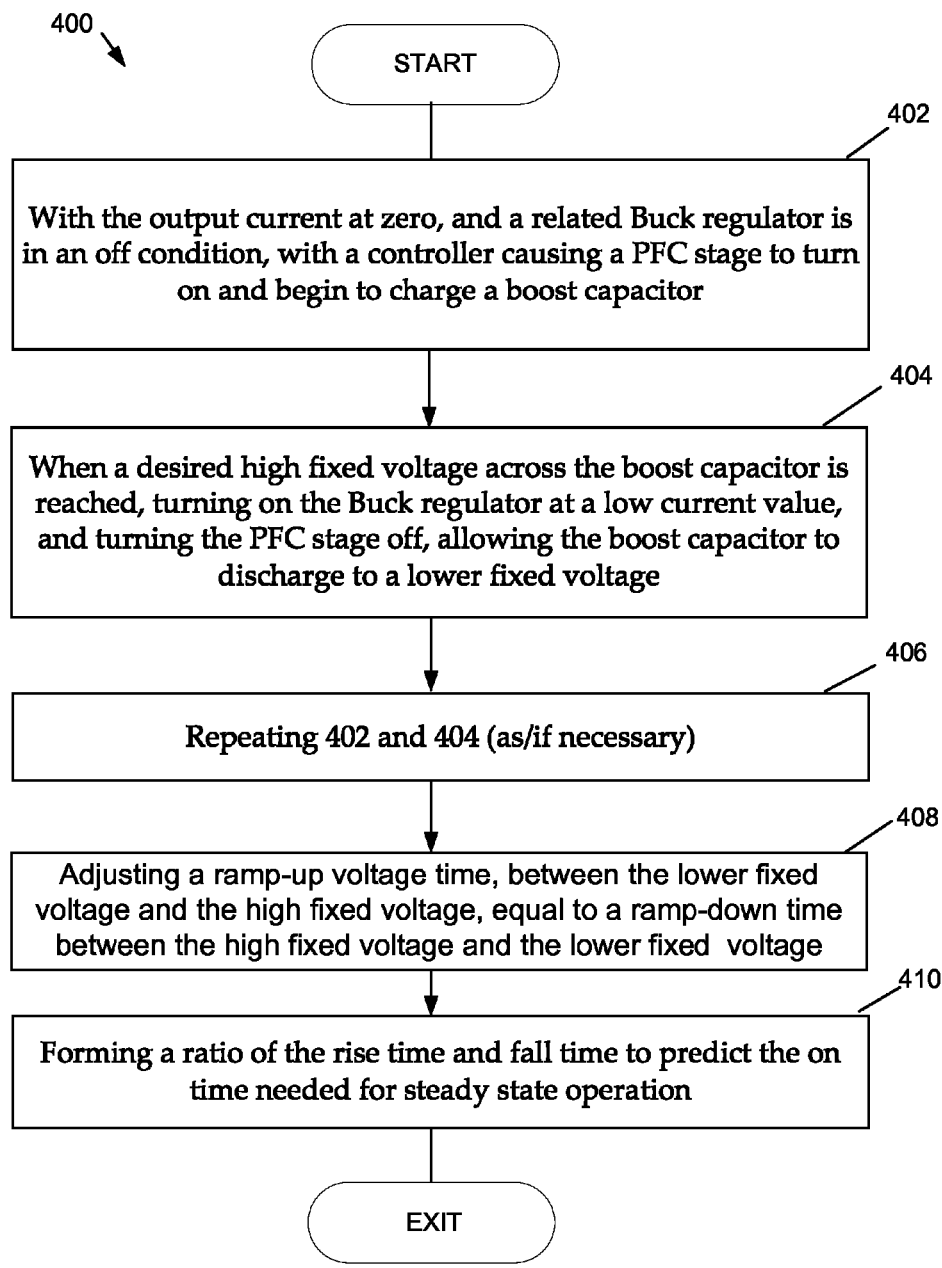

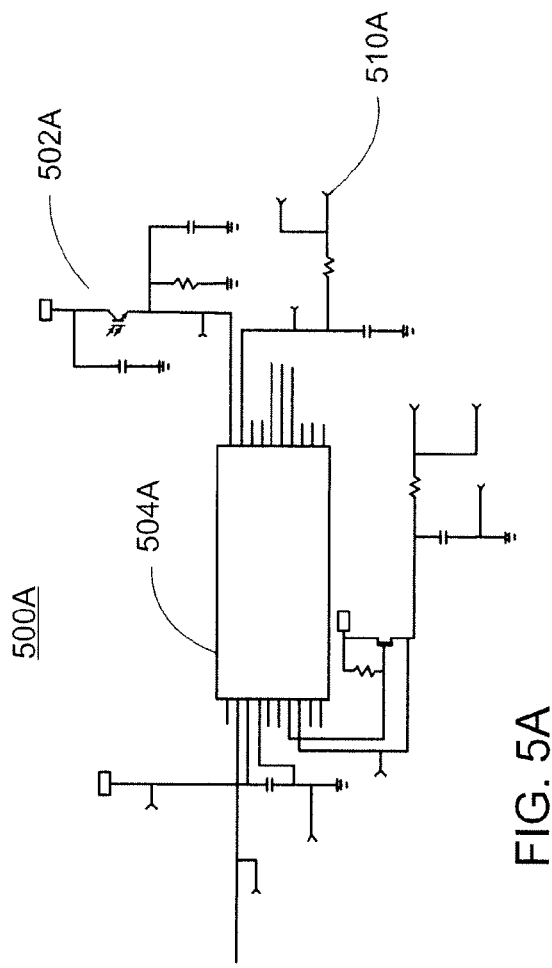
FIG. 5A
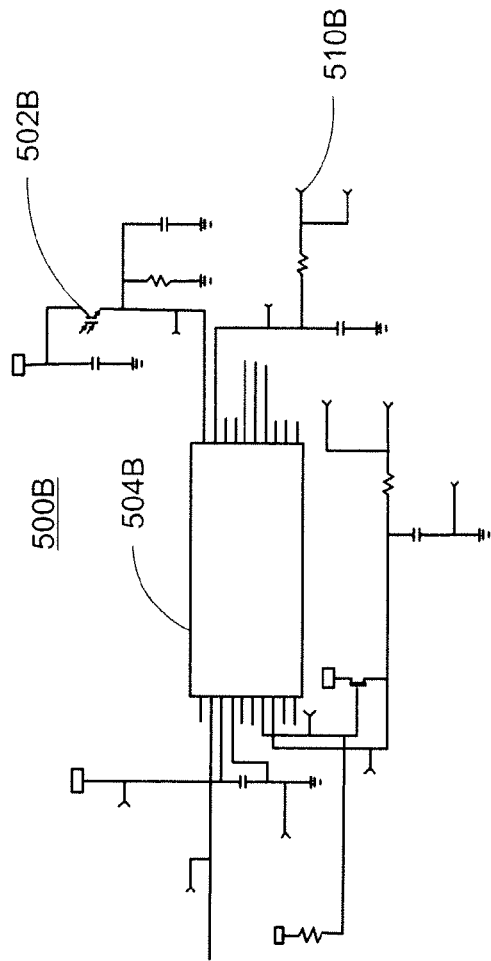
FIG. 5B
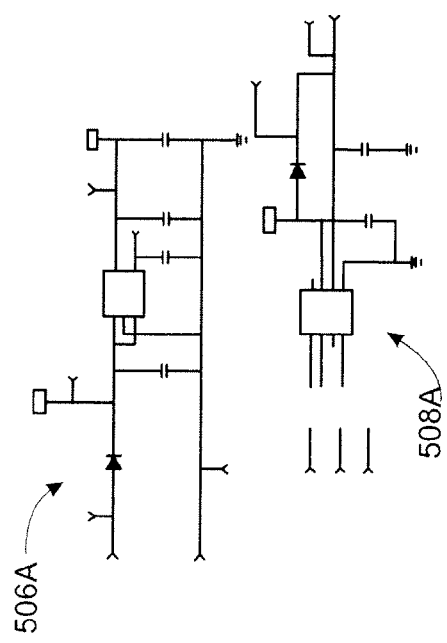
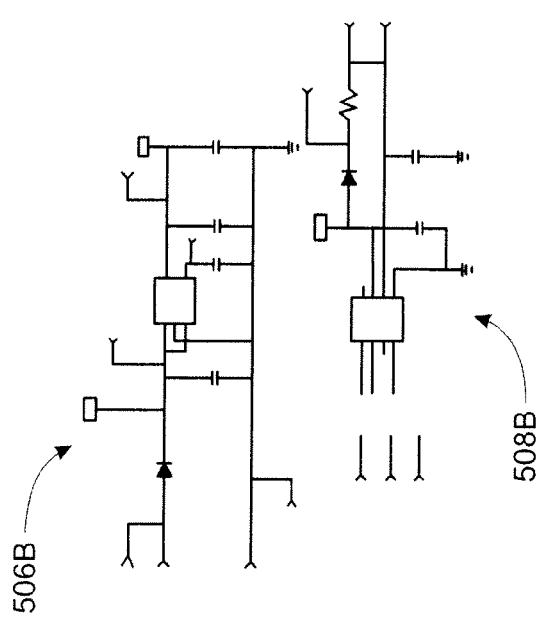

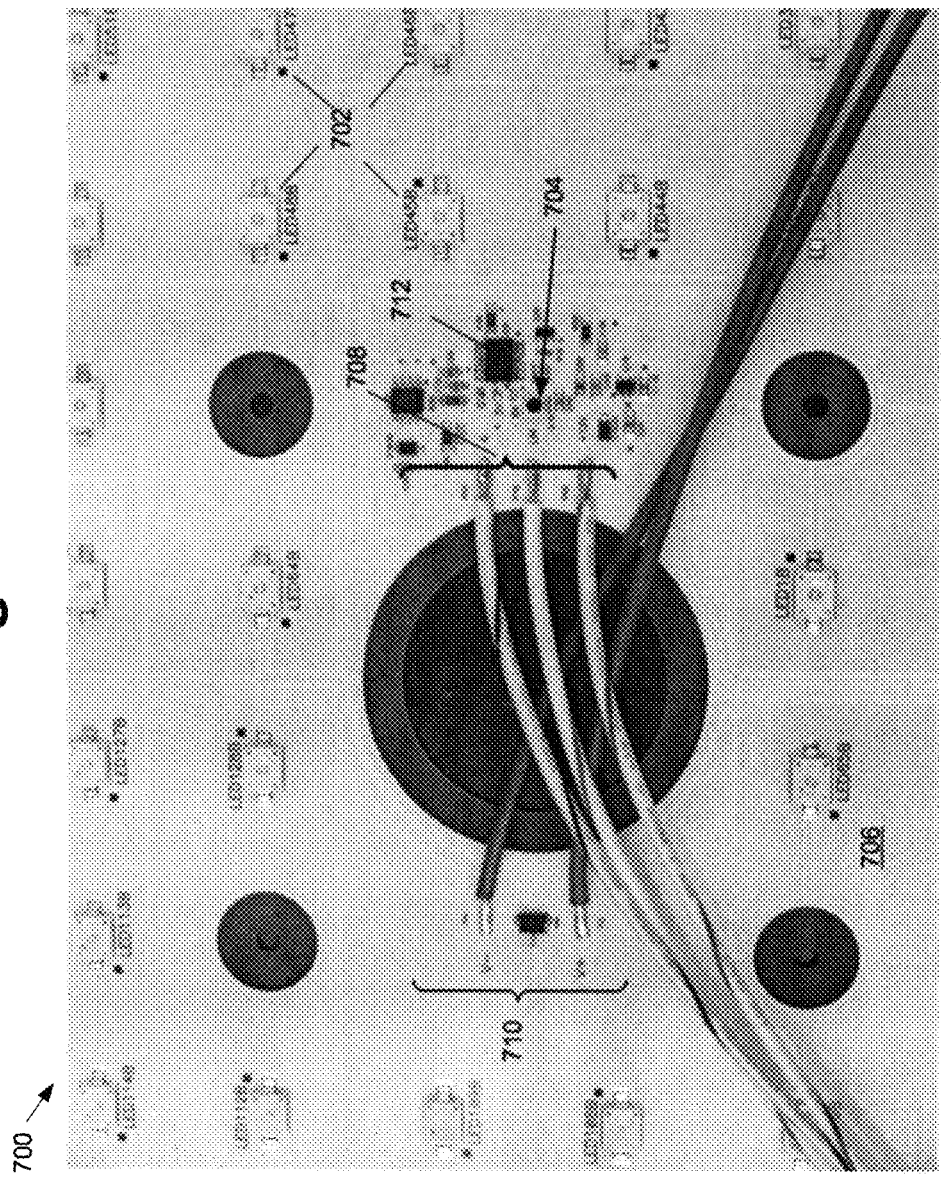

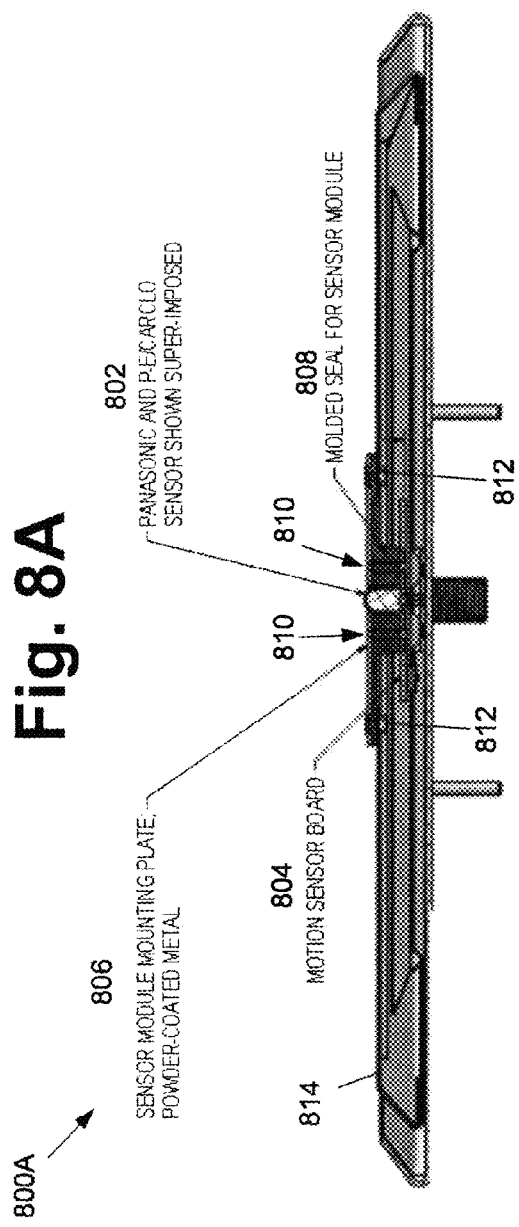
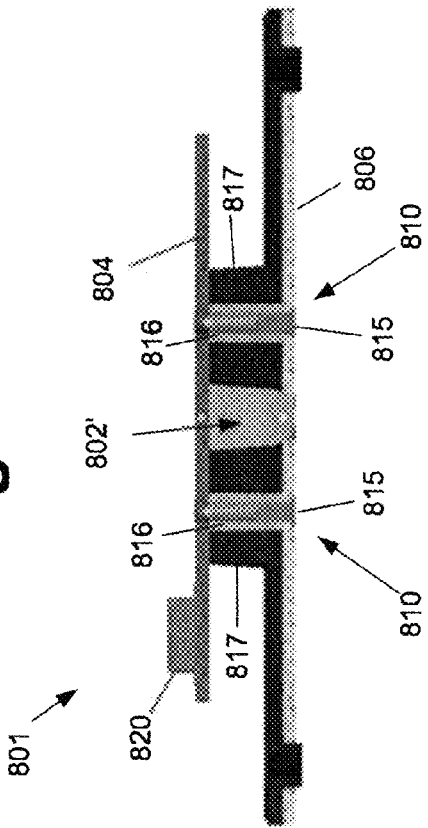
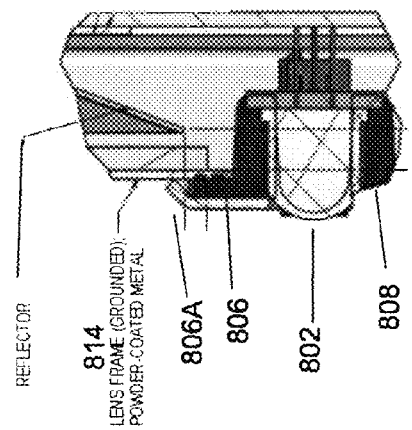

SOLID STATE LIGHTING, DRIVER CIRCUITS, AND RELATED SOFTWARE

RELATED APPLICATION application is a continuation-in-part of U.S. patent application Ser. No. 12/112,101, filed 30 Apr. 2008 and entitled "Power Factor Correction and Driver Circuits," the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates generally to solid state lighting. More particularly, the present disclosure relates to solid state lighting, power factor correction circuits, and driver circuits configured for electrical loads such as series arrangements of light emitting diodes ("LEDs"), including various sensors for intelligent control.

BACKGROUND OF THE DISCLOSURE

Lighting systems are commonly used to illuminate public areas. Light sources of outdoor lighting systems are typically turned on in response to low ambient light conditions (e.g., after sunset) and turned off during high ambient light conditions (e.g., during daylight hours). Many outdoor lighting systems with automatic on-off control systems responsive to ambient light conditions include photoconductive cells photocells).

Known outdoor lighting fixtures with automatic on-off control include photocells sensitive to visible light. Such photocells cannot distinguish between ambient light and light produced by the lighting fixtures. In order to prevent the photocells from being influenced (e.g., triggered) by the light produced by the lighting fixtures, the photocells must be oriented (i.e., aimed) away from the light exiting the lighting fixtures. As a result, the photocells are often positioned in locations where they are subject to harmful conditions.

Lighting systems can also suffer from poor or suboptimal power factor correction (PFC). Poor PFC performance can lead to decreased component longevity. Poor PFC performance can also cause the expensive wasting of power as heat, along with the concomitant need to dispose of such heat.

Such conditions can be of particular concern when high-voltage power is used for lighting systems, such as solid state lighting devices, including those with LEDs. Accordingly, there is a need for improved lighting techniques.

SUMMARY

The present disclosure is directed to and includes techniques and systems, including circuitry, providing solid state lighting, power factor correction circuits, and driver circuits configured for electrical loads such as series arrangements of light emitting diodes ("LEDs"), including various sensors for intelligent control. The techniques and systems, including circuitry, described in the present disclosure can provide relatively high voltages for electrical components with increased and more uniform power and current regulation.

Aspects of the present disclosure are directed to LED lighting fixtures, or luminaires, that can provide any desired selection from among the following attributes/functionalities for among other things, ambient environment sensing, thermal self-monitoring, sensor-based power management, communications, and/or programmability:

An aspect of the present disclosure includes ambient light sensing. Embodiments of luminaires can have the ability to sense sunlight or other ambient light conditions and turn light output off when appropriate, e.g., during daylight hours;

An aspect of the present disclosure includes motion detection. Embodiments of luminaires can sense motion and control light output to transition from a low power (dim) state to a full power state;

An aspect of the present disclosure includes LED temperature sensing. Embodiments of luminaires can have the ability to sense the temperature of its own LEDs and if required reduce power to protect them;

A further aspect of the present disclosure includes driver circuit temperature sensing. Embodiments of luminaires can have the ability to detect driver circuit temperature sensing and if required reduce power to protect it;

A further aspect of the present disclosure includes communication/control—Luminaire can have the ability for communication/control via modules located between the SSD and SSL;

A further aspect of the present disclosure includes the ability for reprogramming functionality. Embodiments of luminaire can be provide for reprogramming of the related driver and/or or light board microcontrollers, or changing operating parameters, e.g., using an IR or RF remote;

A further aspect of the present disclosure include current setpoint selection. Embodiments of luminaires can include a driver that can receive a current setpoint via communication with the SSL and in the absence of such communication run at a pre-programmed setpoint;

A further aspect of the present disclosure includes constant current ability. Embodiments of luminaires can include a driver that provides constant current with LED forward voltages from 0 to 450 V;

A further aspect of the present disclosure includes enhanced Efficiency and lower component stress. Embodiments can include firmware to adjust the power factor correction ("PFC") boost voltage.

A further aspect of the present disclosure includes hysteretic PFC startup.

Exemplary embodiments of the present disclosure can be utilized or implemented for operation and control of configurations of LEDs, e.g., series configurations of a desired number of suitable LEDs.

Exemplary embodiments of PFC stages/circuit and driver stages/circuits can be configured and arranged in a combined circuit. Such embodiments can be utilized as power supplies and may be configured on or with a common circuit board, e.g., on opposing sides of a common circuit board.

Other aspects, embodiments, and details of the of present disclosure will be apparent from the following description when read together with the accompanying drawings.

BRIEF DESCRIPTION OF THE DRAWINGS

Aspects and embodiments of the present disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 4 depicts a method of hysteretic power factor correction (PFC) start-up, in accordance with exemplary embodiments of the present disclosure;

FIGS. 5A-5B depict embodiments of light-sensing circuits, in accordance with embodiments of the present disclosure;

FIG. 7 depicts an enlarged section of a photograph/diagram of a luminaire LED panel, in accordance with an exemplary embodiment of the present disclosure;

FIGS. 8A-8C depicts a luminaire having a motion sensor module and sensor module mounting plate, in accordance with exemplary embodiments of the present disclosure.

Figure 1A:
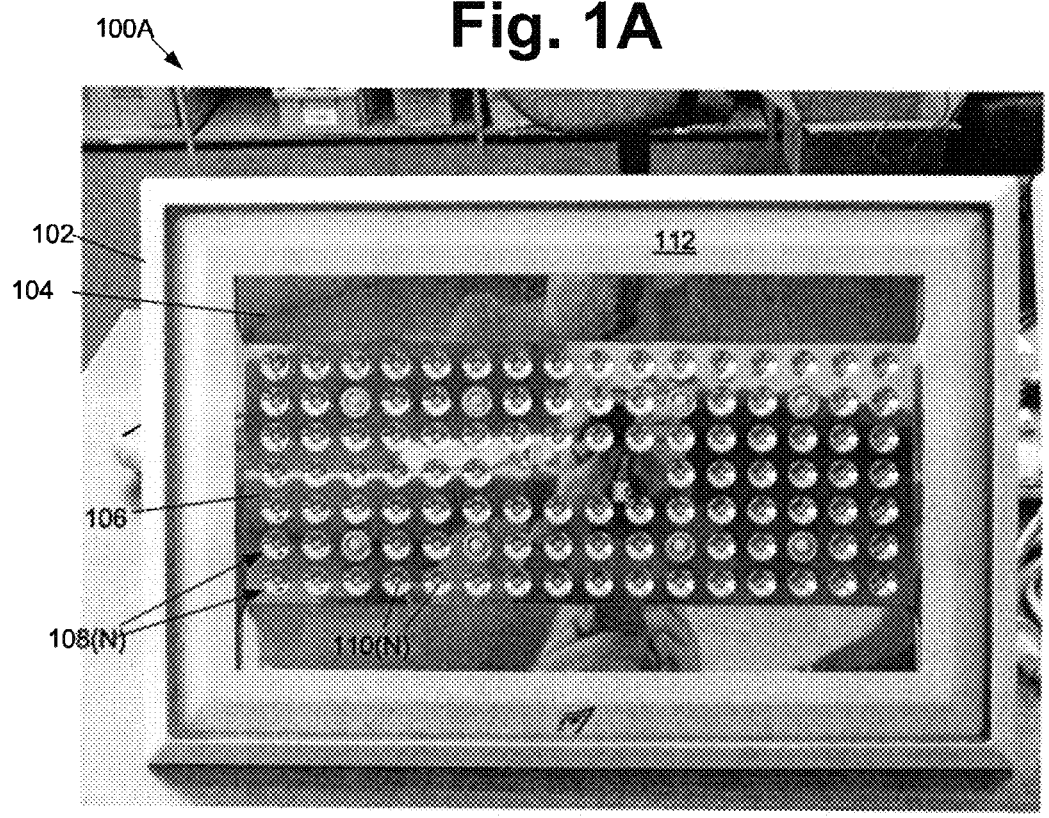
FIG. 1A depicts a photograph/diagram showing a front view of a LED luminaire, in accordance with exemplary embodiments of the present disclosure.

While certain embodiments are depicted in the drawings, the embodiments depicted are illustrative and variations of those shown, as well as other embodiments described herein, may be envisioned and practiced within the scope of the present disclosure.

Moreover, one skilled in the art will also appreciate that while certain component values and/or part/model numbers are shown in the drawings that other suitable parts/components with other suitable values and ratings may be used within the scope of the present disclosure.

DETAILED DESCRIPTION

Aspects of the present disclose are directed to LED lighting fixtures, or luminaires, that can provide for among other things, ambient environment sensing, thermal self-monitoring, sensor-based power management, communications, and/or programmability.

Aspects and embodiments of the present disclosure can provide LED lighting fixtures, or luminaires, that can provide any desired selection from among the following attributes/functionalities:

A. Ambient Light Sensing—Luminaires can have the ability to sense sunlight or other ambient light conditions and turn light output off when appropriate, e.g., during daylight hours;
B. Motion Detection—When powered on, a luminaire can sense motion and control light output to transition from a low power (dim) state to a full power state;
C. LED Temperature Sensing—A luminaire can have the ability to sense the temperature of its own LEDs and if required reduce power to protect them;
D. Driver Temperature Sensing—Luminaire can have the ability to sense the temperature of the internal driver circuit and if required reduce power to protect it;
E. Communication/Control—Luminaire can have the ability for communication/control via modules located between the SSD and SSL;
F. Reprogramming Functionality—Luminaire can be provide for reprogramming of the SSL or SSD microcontrollers, or changing operating parameters, e.g., using an IR or RF remote;
G. Current Setpoint Selection—Luminaires can include a driver (SSD) that can receive a current setpoint via communication with the SSL and in the absence of such communication run at a pre-programmed setpoint;
H. Constant Current—Luminaire can include a SSD that provides constant current with LED forward voltages from 0 to 450 V;
I. Enhanced Efficiency and lower component stress—Firmware can be used to adjust the PFC (power factor correction) boost voltage;
J. Hysteretic PFC startup—Improved PFC can be provided that can achieve a desired on-time relatively quickly.

Aspects and embodiments of the present disclosure may be more fully understood from the description herein when read together with the accompanying drawings, which are to be regarded as illustrative in nature, and not as limiting. In the drawings, prominent features of the depicted circuit embodiments are provided with reference characters (e.g., transistor 333 in FIG. 3A) and called out in the related description while other less prominent features do not have such character references in the drawings or call outs in the description; in the drawings described in this detailed description, however, functional components of the depicted circuit are provided with representative applied voltage inputs and ground symbols as well as circuit element symbols and letters (according to conventional standards), in addition to representative ratings, pin numbers, and/or values (e.g., electrolytic capacitor C15 with nominal capacitance of 120 µF rated for 30 V shown in FIG. 3D) for ease of comprehension. One skilled in the art will appreciate that, while certain component values and/or part/model numbers are shown in the drawing, other suitable parts/components with other suitable values may be used within the scope of the present disclosure.

FIG. 1A depicts a photograph/diagram showing a front view of a LED luminaire 100, in accordance with exemplary embodiments of the present disclosure. Luminaire 100 can include a housing 102 and front cover 104, which can be transparent to a desired wavelength range of light (e.g., visible). Housing 104 can be made of a suitable material (e.g., sheet metal). Front cover can be made of a suitable transparent material, e.g., glass, polycarbonate, acrylic, etc. The luminaire can include a reflector 106 configured and arranged with a number of individual reflective pockets 108(N) that are designed to direct light, from a number of LEDs 110(N), out of the cover 104. The luminaire can include suitable power and control electronics 112, e.g., one or more circuit boards for holding a number of LEDs and control and power electronics, as described in further detail with regards to the other drawings of the present disclosure.

Figure 1B:
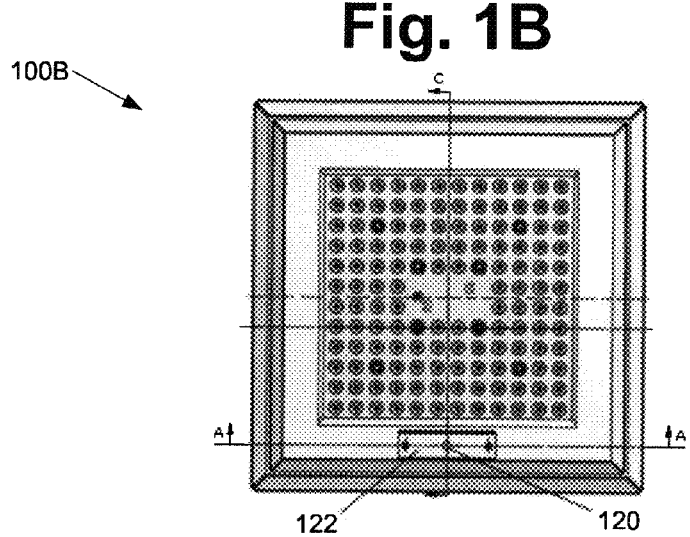
FIG. 1B depicts an alternate embodiment that includes a motion sensor and associated mounting plate.

FIG. 1B depicts an alternate embodiment 100B of a luminaire that includes a motion sensor 120 and associated mounting plate 122 for attaching the sensor and related sensor circuit board to the luminaire housing.

Figure 2:
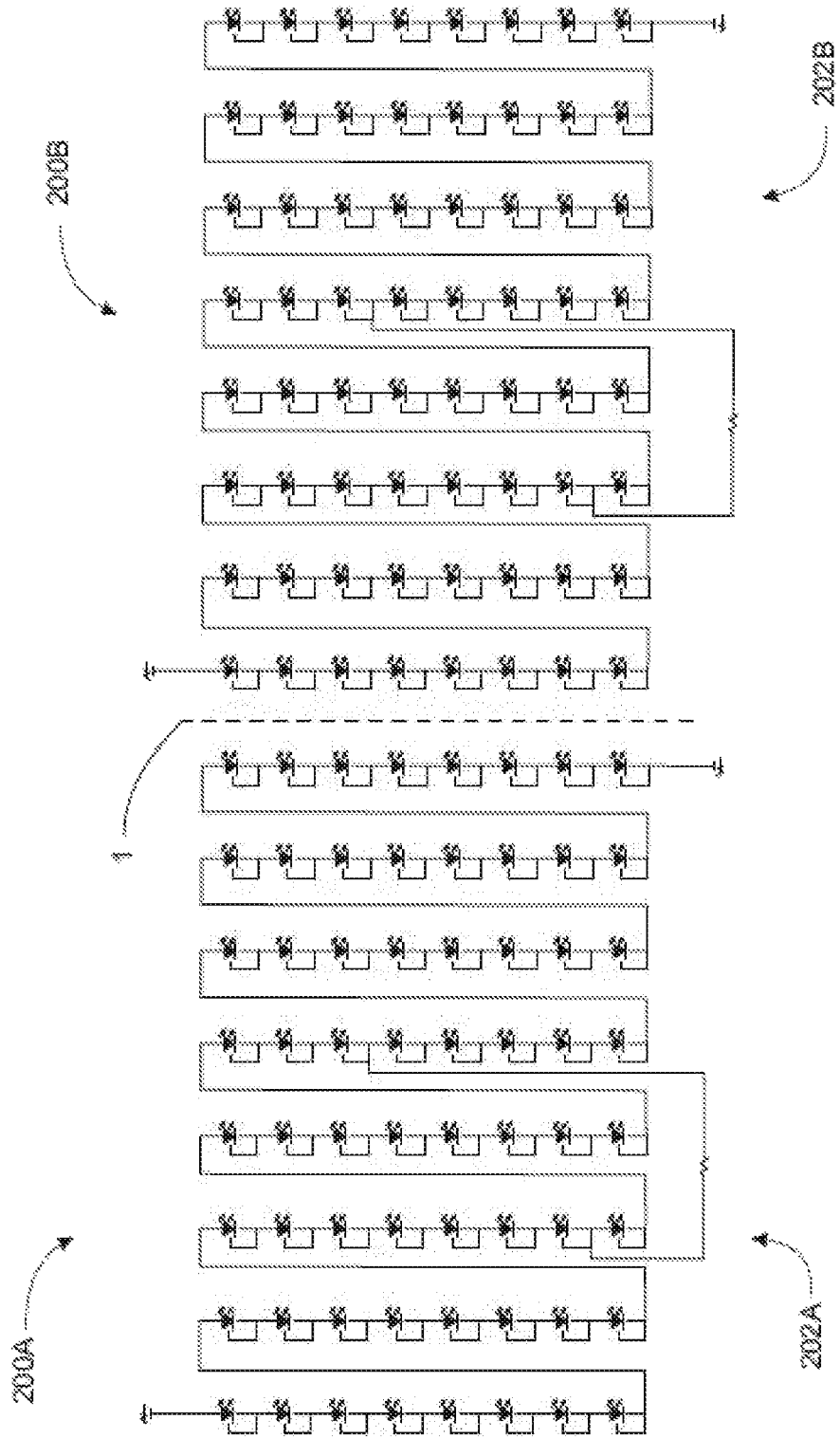
FIG. 2 depicts circuit diagrams of two series of LEDs for a luminaire, in accordance with an exemplary embodiment of the present disclosure.

FIG. 2 depicts circuit diagrams 200A-200B of two series of LEDs 200A-200B for a luminaire, in accordance with an exemplary embodiment of the present disclosure. The LEDs 202A, 200B can be the same or different. The LEDs 202A and 200B can on opposing single of a single printed circuit board for exemplary embodiments (as indicated by diving line 1). In exemplary embodiments, the LEDs 202A and 202B can include Nichia NS6W LEDs or Osram Golden Dragon LEDs. In alternate embodiments, the LEDs can also be connected in N parallel strings, each of which is composed of M LEDs in series. For instance, an embodiments can contain an SSL that has 128 LEDs configured as two parallel strings of 64 LEDs each.

Figure 3A:
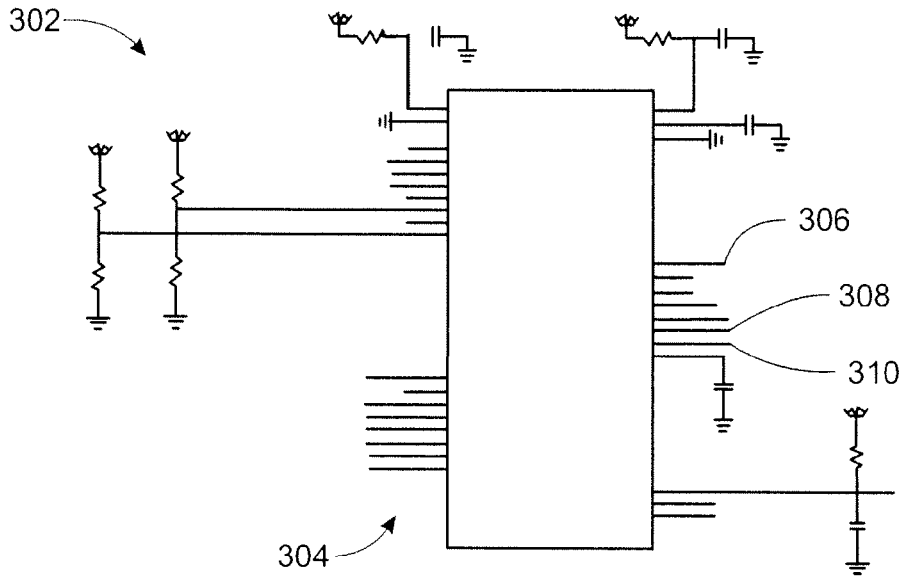
FIGS. 3A-3E depict circuit portions of a solid state driver (SSD) circuit, in accordance with exemplary embodiments of the present disclosure.

FIGS. 3A-3E depict schematic views of a number of sub-circuits of a solid state driver "SSD" circuit 300, in accordance with exemplary embodiments of the present disclosure. Circuit 300 can include a number of functional parts, including a main controller circuit 302 with controller 304 as shown in FIG. 3A. In exemplary embodiments, the circuit portions depicted in FIGS. 3A-3E can be placed on a single printed circuit board with a luminaire, e.g., luminaire 100 of FIG. 1. In exemplary embodiments, a AT90PWM316 controller as made commercially available by Amtel Corporation can be used for controller 304; such a controller is designed for Lamp ballast and Motor Control applications, and features 16 Kbytes Flash memory, 10-channel advanced PWM, 11-channel 10-bit ADC, a 10-bit DAC, three 12-bit High Speed PSC (Power Stage Controllers) with 4-bit Resolution Enhancement and DALI protocol support, and internal comparator and A/D converter. Controller 304 can have a number of pins, e.g., pins 306 ("LED_PWM"), 308 ("ACMP_LED1"), and 310 ("AD_LED1") as shown.

Figure 3B:
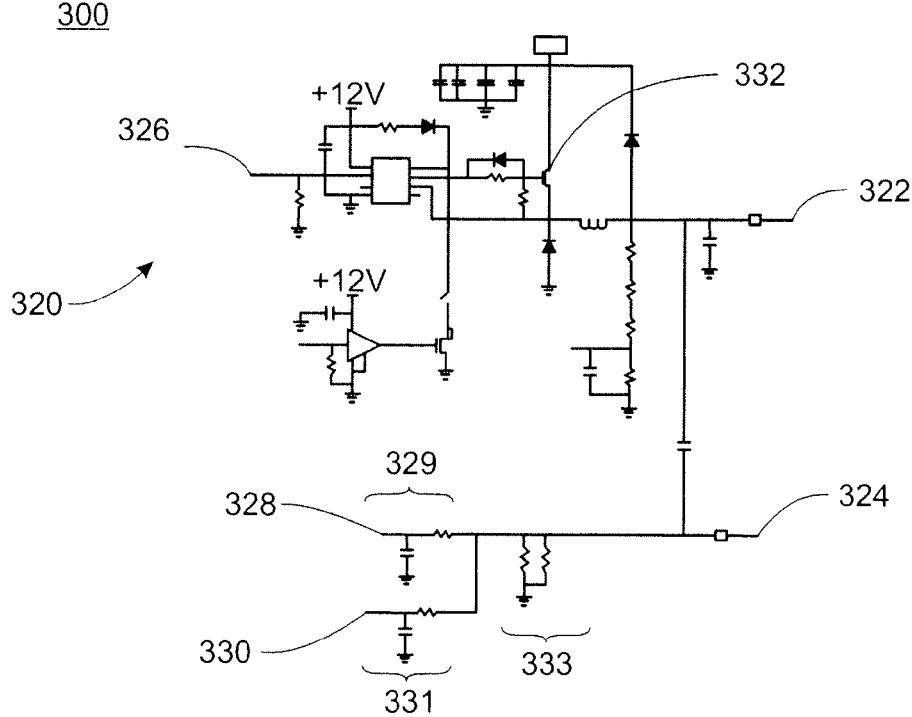

FIG. 3B depicts a control and power regulation portion 320 of SSD circuit 300 for controlling and regulating power to the electrical load across 322 and 324, such as LEDs 202A in FIG. 2. Circuit 320 can include and/or function as a Buck regulator, in exemplary embodiments as shown. As shown the output voltage can be 500 V DC for some applications. Traces 326 ("LED_PWM"), 328 ("ACMP_LED1"), and 330 ("AD_LED1") can be connected to corresponding pins of controller 304 (FIG. 3A).

With continued reference to FIG. 3B, in operation as trace 326 goes high, transistor switch 332 turns on, allowing current to flow through the electrical load across 322 and 324, e.g., a string of LEDs. The current then flows through parallel resistor pair 333. In tandem with an internal comparator (present in exemplary embodiments) in controller 302, RC circuits 331 and 329 both act as a low pass filters. RC circuit 331 and 329 both act as low pass filters. The time constant for 331 is longer than the time constant for 329. This can allow for hardware and/or firmware to control circuit operation with minimal need for software oversight (e.g., interrupts), which can free up software resources for other use(s).

Figure 3C:
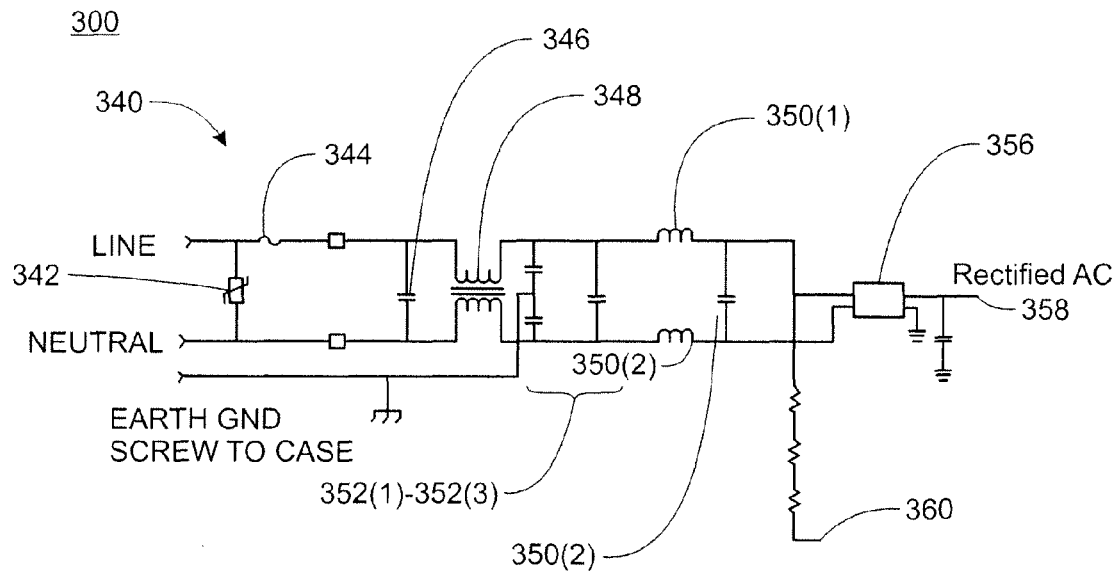
Figure 3D:
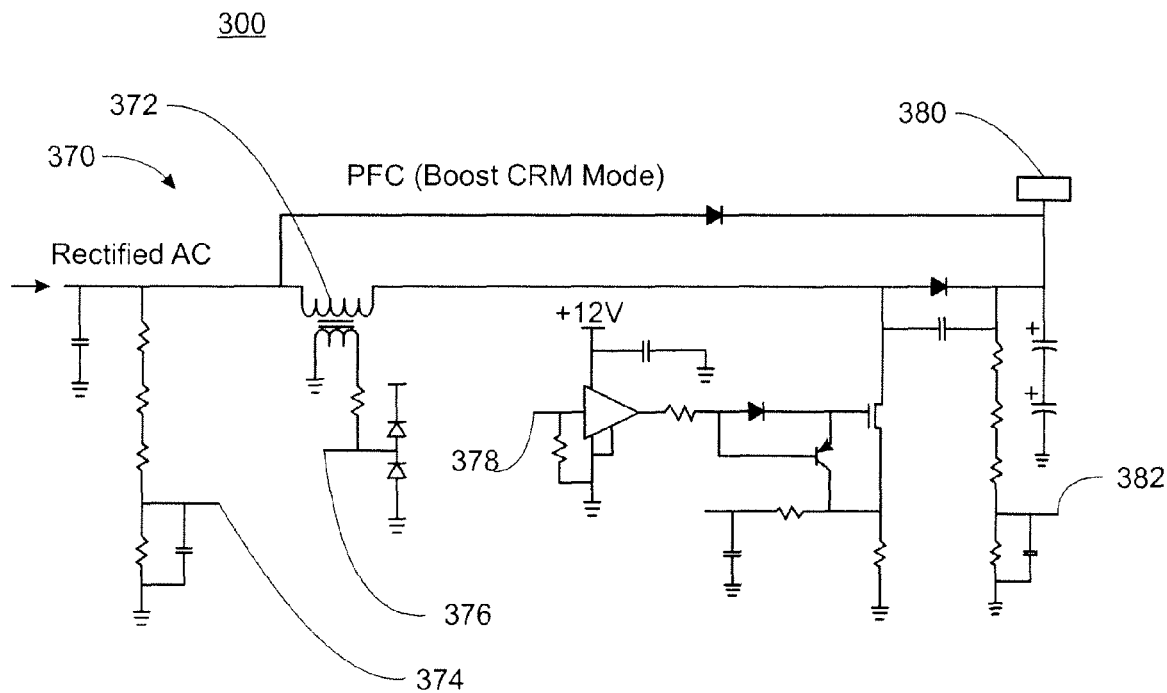

With reference to FIGS. 3C-3D, SSD circuit 300 can include an EMI filter portion 340 and power factor correction (PFC) stage 370 including a boost circuit/portion (e.g., configured in a boost preconverter topology or circuit portion). The EMI filter 340 can be configured to receive AC power, such as supplied by a typical 120 Volt AC source with a line, neutral, and earth ground, as shown. The EMI filter circuit 340 can include a varistor 342, fuse 344, multiple capacitors 346 and 352(1)-352(4), and one or more coils/inductors 350(1)-350(2) for EMI shielding/filtering as shown. In addition, circuit 340 can include a rectifier 356 for producing an output of rectified AC 358. A trace 360 can connect EMI filter circuit 340 to controller 304. In exemplary embodiments, a GBU806 diode, rectifier bridge nominally rates for 8 A, 600 V as made commercially available by Diodes Inc. can be used for rectifier 356.

With reference to FIG. 3D, in exemplary applications and implementations, the PFC stage 370 can be configured for operation in critical conduction mode (CRM). PFC stage 370 may configured and arranged as shown to receive rectified AC from the EMI filter circuit 340 for facilitating/producing a rectified voltage and current for the boost circuit for supply to circuit portion 320.

PFC stage 370 can include a PFC coil 372, and can produce a desired boosted voltage, e.g., 500 V DC, shown at 380. In exemplary embodiments, PFC coil can me a 4810144R inductor for PFC boost, rated at 400 micro Henrys as made commercially available by Minntronix Inc. of 1600 9th Avenue SW, Watertown, S. Dak. 57201-5012 USA. Traces 374 ("AD_ACIN"), 376 ("ACMP_PFC_ZC"), 378 ("PFC_PWM), and 382 (AD_BOOST") can be connected to a controller, e.g., controller 302 in FIG. 3A for PFC control. Such PFC control can include the Hysteretic PFC start-up operation as described further detail for FIG. 4.

Firmware, such as in controller 304, can be used to adjust the PFC (power factor correction) boost voltage provided by PFC stage 370. Enhanced Efficiency and lower component stress can be provided by implementation of adjustable boost voltage. It is preferred that boost voltage be larger than both the peak input voltage and the output voltage. Running at a high fixed boost voltage when not required results in lower efficiency and higher component stresses. With a high input voltage, high boost is required. It can often be the case, however, that the SSD is running at 120 V AC input with a medium output, e.g., 240 V DC. In such a case, a boost voltage that is 60 V (or so) over the higher of either the peak AC input or the output would be better for efficiency and lessening component stress. Lowering the boost voltage too low, however, can cause the EMI front end to become overloaded in some situations. Monitoring the PFC MOSFET current can be used to prevent this situation, and used for adjustment of the boost voltage. The controller 304 and control circuit can provide Hysteretic PFC startup, described above. Such hysteretic PFC start up can provide for improved PFC performance and operation, as is described for FIG. 4.

Figure 3E:
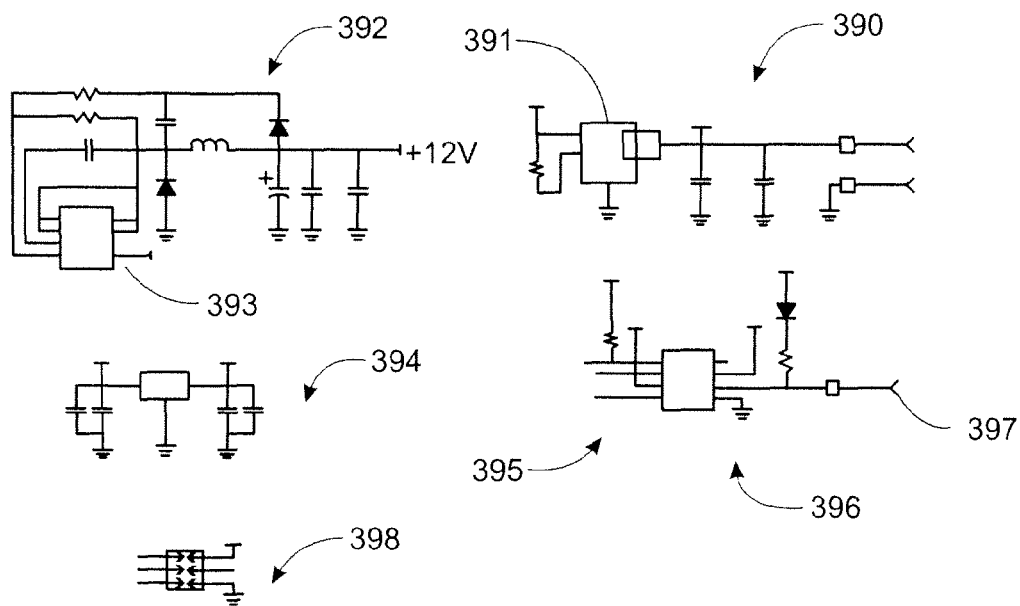

With reference to FIG. 3E, SSD circuit 300 can also include a power supply 390 for printed circuit board components circuits when the associated lighting elements (e.g., LEDs 202 in FIG. 2) are in an off state. A controller 391 can limit current that is output, which can be beneficial for short conditions and for safety. An off-line switching power supply 392, with included controller 393, can be included in circuit 300 as shown. A linear voltage regulator 394 can be included for exemplary embodiments.

With continued reference to FIG. 3E, a communications circuit 395 can also be included in SSD circuit 300. The communications circuit 395 can include a LIN transceiver 396. The LIN transceiver 396 can be configured to communicate over a single line 397 with a counter part on a SSL board, e.g., as a slave component controlled by a master component on the SSL board. Circuit 396 (or other communications circuits utilized) can provide a luminaire with the ability for communication/control via modules located between the SSD and SSL. Such modules may provide a variety of communication methods/protocols. Protocols can include, but are not limited to DALI, 0-10v Analog, 4-20 maA analog, LIN, CAN, RS-232, RS-422, RS-485, Ethernet, Flexray, Zigbee, DASH7. Circuit 300 can also include a standard header 398, as shown.

FIG. 4 depicts a method 400 of hysteretic power factor correction ("Hysteretic PFC") start-up, in accordance with exemplary embodiments of the present disclosure. By their nature the settings of a boost PFC must change slowly to be effective. The key for good Critical Conduction Mode Boost PFC is constant MOSFET ontime over several AC cycles. In steady state operation this is possible. During startup, however, the proper on-time should be established quickly. There are a few ways to do this. Single chip solutions handle it by way of a compensated feed back network looking at the boost voltage. This can also be done with a microcontroller, e.g., microcontroller 302 of FIG. 3A, by another option referred to herein as "Hysteretic PFC" startup as provided by exemplary embodiments of the present disclosure. Method 400 can be embodied in software and/or firmware (with suitable computer/machine readable instructions in any suitable languages) in exemplary embodiments.

With continued reference to FIG. 4, with the output current off (Buck regulator off) the PFC starts up at a nominal rate and begins to charge the boost capacitor, as described at 402. When some high fixed voltage is reached, say 475 V, the buck is turned on at a low value, say 200 mA and the PFC is turned off, as described at 404. The boost capacitor then discharges as it feeds the load. When it discharges to some lower fixed voltage, say 425v, the PFC is turned back on. This can happen multiple times, as described at 406, while the on-time is adjusted to make the time from 425 V to 475 V equal to the time from 475 V to 425 V, as described at 408 ("Adjusting a ramp-up voltage time, between a first voltage and a second voltage, equal to a ramp-down time"). During the time going down the load is being fed by the boost capacitor. While going up, the PFC circuit is feeding both the load and the capacitor. A ratio of the rise time and fall time can be formed that allows good prediction of the on time needed for steady state operation, as described at 410. The mode is then exited when the steady state value is reached (shown as "exit"). The advantage of this technique is that a very simple microcontroller can be used as no floating point math is required, it is stable and it has the capability to reach a stable condition quickly.

FIGS. 5A-5B depict light-sensing circuits 500A-500B, in accordance with embodiments of the present disclosure. Each light detection circuit 500A, 500B can include an optical sensor 502A, 502B, which may also be referred to as a "light" sensor, and a microcontroller 504A, 504B. Light-sensing circuits 500A and 500B are shown as being similar, and may be optimized for use with a particular type of SSL board, e.g., boards 200A and 200B of FIG. 2, respectively. Circuits 500A, 500B can include a voltage regulation portion 506A, 506B. Exemplary embodiments can include a line transceiver, or LIN transceiver, 508A, 508B, which can communicate with a counter part, e.g., to act as a master for slave LIN transceiver 396 of the SSD as shown in FIG. 3E. A LIN transceiver can among other things set a time-slice protocol to communicate data from sensor 502A, 502B. Also shown in circuits 500A, 500B are connections for a motion detection circuit, e.g., as shown and described for FIG. 6. Such a sensor can be connected to a suitable controller (e.g., 302 of FIG. 3A) and light output of LEDs (e.g., LEDs 202 of FIG. 2) can be dimmed or turned off when light is detected by sensor 502.

With continued reference to FIGS. 5A-5B, the light sensor, e.g., sensor 502A, can be any suitable light sensor and the detection wavelength range of the sensor can be selected as desired, e.g., by appropriate selection of the materials of the sensor. Photodiodes and/or phototransistors can be used for exemplary embodiments. For exemplary embodiments, the light sensor can sense visible or IR light outside of the wavelength range emitted by the associated LEDs, e.g., LEDs 202 in FIG. 2. As shown in FIGS. 5A-5B, suitable optical sensors include an OSRAM Opto Semiconductor SFH 320 FA-4-Z Phototransistor IR Chip Silicon NPN Transistor 980 nm 2-Pin PLCC, as made commercially available by Osram Gmbh.

Figure 6:
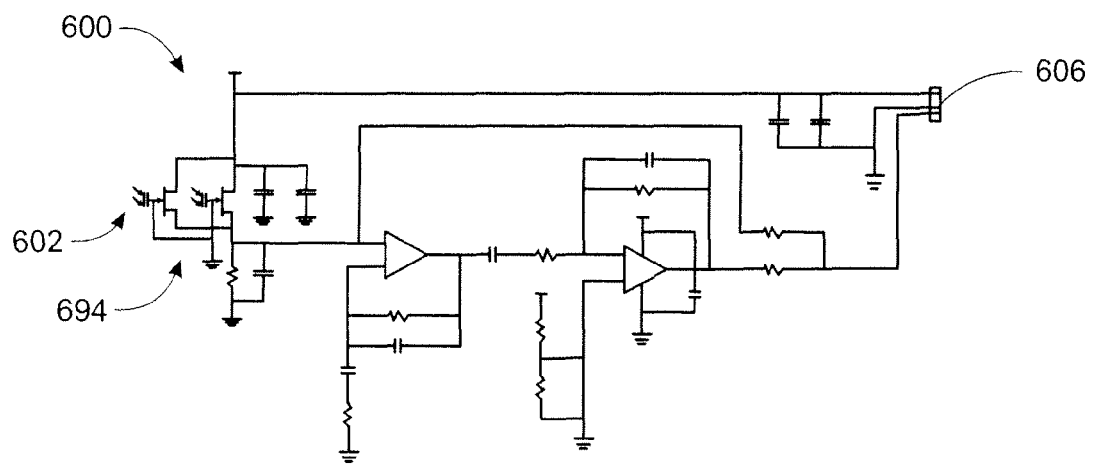
FIG. 6 depicts a schematic of a motion detection circuit, in accordance with an exemplary embodiment of the present disclosure.

FIG. 6 depicts a schematic of a motion detection circuit 600, in accordance with an exemplary embodiment of the present disclosure. As noted previously, luminaires and lighting components of the present disclosure can provide for motion detection sensing and can include a motion detection sensor circuit 600 that includes one or more optical sensors 602, 604. In exemplary embodiments, optical sensor 602 is a medium-wave infrared detector or long-wave infrared detector. Suitable optical detectors include a Panasonic AMN11112, which has built in electronics so the resistor for it bypasses the amplifier on the PCB, and a Perkin Elmer LHi 1128, which does not have built in electronics so it needs the amplifier(s) of circuit 600. Exemplary embodiments can include the feature of switching between different sensors 602, 604 depending on application. A connection terminal 606, e.g., suitable for connection to light sensor circuit 500B in FIG. 5B, is also shown.

With continued reference to FIG. 6, as some preferred infrared wavelength ranges are filtered by glass, circuit 600 can be placed on a separate circuit board having access to a non-glass, e.g., polyethylene, lens/cover so that the IR wavelengths of interest can be received. For some applications, the circuit board with circuit 600 can be located adjacent an aperture in a luminaire housing (e.g., one made of sheet metal).

FIG. 7 depicts an enlarged section of a photograph/diagram of a luminaire LED panel 700, in accordance with an exemplary embodiment of the present disclosure. A number of LEDs 702 are shown along with a photodiode (optical sensor) 704 mounted on a printed circuit board 706. A set 708 of three leads are shown for photodiode 704 and related circuit with controller 712. A pair 710 of leads are shown for supplying power (e.g., at 500 V) to the LEDs 702.

FIGS. 8A-8C depict an embodiment 800A of a luminaire having a motion sensor in accordance with exemplary embodiments of the present disclosure. FIGS. 8A-8C depict, among other things, a feature of mounting a motion sensor (or other component, to a reflector or housing for providing light/optical sensing or light output along with environmental resistance, e.g., to rain and snow.

The section view of FIG. 8A, can correspond to cutting section A-A in FIG. 1B. Luminaire 800A includes motion sensor 802 on motion sensor board 804. Motion sensor board 804 can include a motion detection circuit, e.g., as shown and described for FIG. 6, and can have a suitable connection plug or feature for connection to a SSL board, e.g., to connection 510B of FIG. 5B. Also included is a molded seal 808 for the sensor 802 (which together with the board 804 can be referred to as a sensor module). The molded seal can be made of any suitable material. Exemplary embodiments include polymeric materials, e.g., ethylene propylene diene Monomer (M-class) rubber (EPDM), silicone, and the like. The motion sensor board 804 can be attached to the sensor module mounting plate 806 by suitable fasteners or connections. In exemplary embodiments, threaded connections, as indicated by 810 (and shown in greater detail in FIG. 8C), can be used to fasten board 804 to plate 806. Likewise, the sensor module mounting plate 806 itself can be mounted to the housing or lens frame 814 by suitable connections. In exemplary embodiments, threaded connections, as indicated by 812, can be used to fasten plate 806 to frame 814.

FIG. 8B depicts a detail view of a portion of the sensor module of luminaire 800A. In addition to the motion sensor 802 and gasket 808, the mounting plate 806 and mounting plate edge 806A are shown in relation to lens frame 814.

FIG. 8 shows the sensor module 801 standing alone (the sensor is omitted for clarity); the position of the sensor is indicated by 802'. As shown, the connection 810 between the sensor board 804 and mounting plate 806 can include a rivet or screw 815 and a threaded (e.g., metal) cylinder 816 surrounded by a protrusion or raise portion 817 of the gasket, for exemplary embodiments. Connection 820 is shown.

Accordingly, embodiments of the present disclose can provide for among other things, ambient environment sensing, thermal self-monitoring, sensor-based power management, communications, and/or programmability. Aspects and embodiments of the present disclosure can provide LED lighting fixtures, or luminaires, that can provide any desired selection from among the following attributes/functionalities: Ambient Light Sensing—Luminaires can have the ability to sense sunlight or other ambient light conditions and turn light output off when appropriate, e.g., during daylight hours; Motion Detection—When powered on, a luminaire can sense motion and control light output to transition from a low power (dim) state to a full power state; LED Temperature Sensing—A luminaire can have the ability to sense the temperature of its own LEDs and if required reduce power to protect them; Driver Temperature Sensing—Luminaire can have the ability to sense the temperature of the internal driver circuit and if required reduce power to protect it; Communication/Control—Luminaire can have the ability for communication/control via modules located between the SSD and SSL; Reprogramming Functionality—Luminaire can be provide for reprogramming of the SSL or SSD microcontrollers, or changing operating parameters, e.g., using an IR or RF remote; Current Setpoint Selection—Luminaires can include a driver (SSD) that can receive a current setpoint via communication with the SSL and in the absence of such communication run at a pre-programmed setpoint; Constant Current—Luminaire can include a SSD that provides constant current with LED forward voltages from 0 to 450 V; Enhanced Efficiency and lower component stress—Firmware can be used to adjust the PFC (power factor correction) boost voltage; and Hysteretic PFC startup—Improved PFC can be provided that can achieve a desired on-time relatively quickly.

Moreover, embodiments according of the present disclosure can be utilized for application of relatively high-voltage (e.g., 425 V-500+V DC) power to series configurations of LEDs (or other light sources), which are used in many industries and for many applications. Such LEDs commonly require an applied voltage of between 2.5 and 4.5 V. LEDs can be of any kind, color (e.g., emitting any color or white light or mixture of colors and white light as the intended lighting arrangement requires) and luminance capacity or intensity, preferably in the visible spectrum. LEDs can comprise any semiconductor configuration and material or combination (alloy) that produce the intended array of color or colors. The LEDs can have a refractive optic built-in with the LED or placed over the LED, or no refractive optic; and can alternatively, or also, have a surrounding reflector that re-directs low-angle and mid-angle LED light outwardly.

While certain embodiments have been described herein, it will be understood by one skilled in the art that the methods, systems, and apparatus of the present disclosure may be embodied in other specific forms without departing from the spirit thereof. For example, while aspects and embodiments herein have been described in the context of certain input or output voltages and currents, others may of course be realized and utilized within the scope of the present disclosure.

Moreover, while embodiments of the present disclosure have been described in the context of supplying power to electrical loads consisting of series configurations of LEDs, the description of the electrical loads as LEDs has merely been by example, and the scope of the disclosure is not limited to such. It will be appreciated that the present disclosure can be used with virtually any type of electrical load. One skilled in the art will appreciate that embodiments of the present disclosure can be implemented in hardware, software, firmware, or any combinations of such, and over one or more communications networks or links. Moreover, embodiments of the present disclosure can be included in or carried by various signals, e.g., as transmitted over a wireless RF or IR communications link or downloaded from the Internet.

Accordingly, the embodiments described herein, and as claimed in the attached claims, are to be considered in all respects as illustrative of the present disclosure and not restrictive.

What is claimed is:

1. A solid state lighting driver circuit comprising:
   an EMI filter configured and arranged to receive an AC input from an AC power supply;
   a rectifier connecting the EMI filter, the rectifier being configured and arranged to receive AC power from the EMI filter and produce a rectified current;
   a power factor correction (PFC) stage including a boost circuit connected to the rectifier, the boost circuit being configured and arranged to receive the rectified current and to produce a power factor corrected output with a higher voltage than the AC input of the AC power supply;
   a Buck regulator configured and arranged to receive power from the PFC stage and regulate power for supply to a plurality of LEDs; and
   a controller configured and arranged to control the Buck regulator and PFC stage for hysteretic PFC start-up, wherein the controller is configured and arranged to (i) with the output current of the PFC stage at zero, and with the Buck regulator in an off condition, cause the PFC stage to turn on and begin to charge a boost capacitor, (ii) when a desired high fixed voltage across the boost capacitor is reached, turn the Buck regulator on at a low current value and turn off the PFC stage allowing the boost capacitor to discharge to a lower fixed voltage as it supplies current to the plurality of LEDs, (iii) adjust a ramp-up voltage time, between the lower fixed voltage and the high fixed voltage, to equal a ramp-down voltage time between the high fixed voltage and the lower fixed voltage, and (iv) turn the PFC stage back on.

2. The circuit of claim 1, wherein the EMI filter is configured and arranged to receive a 120 V AC input and the boost circuit is configured and arranged to produce an output of about 500 V DC.

3. The circuit of claim 1, wherein the controller is configured and arranged to provide PWM control of the Buck regulator.

4. The circuit of claim 1, further comprising a communications circuit configured and arranged to communicate with a solid state lighting (SSL) circuit.

5. The circuit of claim 4, wherein the communications circuit operates with a protocol selected from the group consisting of DALI, 0-10v Analog, 4-20 maA analog, LIN, CAN, RS-232, RS-422, RS-485, Ethernet, Flexray, Zigbee, DASH7.

6. A lighting power supply comprising:
   (i) a PFC stage including:
      an EMI filter configured and arranged to receive an AC input from an AC power supply;
      a rectifier connecting the EMI filter portion, the rectifier being configured and arranged to receive AC power from the EMI filter and produce a rectified current; and
      a boost portion connected to the rectifier, the boost portion being configured and arranged to receive the rectified current and to produce a power factor corrected output with a higher voltage than the AC input of the AC power supply; and (ii) a driver stage, configured and arranged to receive output from the PFC stage and supply as an output power to an electrical load, the driver stage including a Buck regulator; and (iii) a controller configured and arranged to control the Buck regulator and PFC stage for hysteretic PFC startup, wherein the controller is configured and arranged to (i) with the output current of the PFC stage at zero, and with the Buck regulator in an off condition, cause the PFC stage to turn on and begin to charge a boost capacitor, (ii) when a desired high fixed voltage across the boost capacitor is reached, turn the Buck regulator on at a low current value and turn off the PFC stage allowing the boost capacitor to discharge to a lower fixed voltage as it supplies current to the electrical load, (iii) adjust a ramp-up voltage time, between the lower fixed voltage and the high fixed voltage, to equal a ramp-down voltage time between the high fixed and the lower fixed voltage and (iv) turn the PFC stage back on.

7. A lighting apparatus comprising:
(i) a PFC stage including:
an EMI filter configured and arranged to receive an AC input from an AC power supply;
a rectifier connecting the EMI filter portion, the rectifier being configured and arranged to receive AC power from the EMI filter and produce a rectified current; and
a boost portion connected to the rectifier, the boost portion being configured and arranged to receive the rectified current and to produce a power factor corrected output with a higher voltage than the AC input of the AC power supply; and
(ii) a power regulation circuit including a Buck regulator, configured and arranged to receive output from the PFC stage and supply as an output power to an electrical load;
(iii) a controller configured and arranged to control the Buck regulator and PFC stage for hysteretic PFC startup, wherein the controller is configured and arranged to (i) with the output current of the PFC stage at zero, and with the Buck regulator in an off condition, cause the PFC stage to turn on and begin to charge a boost capacitor, (ii) when a desired high fixed voltage across the boost capacitor is reached, turn the Buck regulator on at a low current value and turn off the PFC stage allowing the boost capacitor to discharge to a lower fixed voltage as it supplies current to the one or more lighting elements, (iii) adjust a ramp-up voltage time, between the lower fixed voltage and the high fixed voltage, to equal a ramp-down voltage time between the high fixed and the lower fixed voltage, and (iv) turn the PFC stage back on; and
(iv) one or more lighting elements configured and arranged to receive power from the power regulation circuit.

8. The lighting apparatus of claim 7, wherein the one or more lighting elements comprise one or more LEDs.

9. The lighting apparatus of claim 7, further comprising an optical sensor to detect ambient light.

10. The lighting apparatus of claim 7, further comprising a motion detector to detect motion.

11. A lighting apparatus comprising:
(i) a PFC stage including:
an EMI filter configured and arranged to receive an AC input from an AC power supply;
a rectifier connecting the EMI filter portion, the rectifier being configured and arranged to receive AC power from the EMI filter and produce a rectified current; and
a boost portion connected to the rectifier, the boost portion being configured and arranged to receive the rectified current and to produce a power factor corrected output with a higher voltage than the AC input of the AC power supply;
(ii) a power regulation circuit including a Buck regulator, configured and arranged to receive output from the PFC stage and supply as an output power to an electrical load;
(iii) a controller configured and arranged to control the Buck regulator and PFC stage for hysteretic PFC startup;
(iv) one or more lighting elements configured and arranged to receive power from the power regulation circuit;
(v) a motion detector to detect motion, and
(vi) a luminaire housing with an aperture and a motion sensor module plate connected to the housing, wherein the motion sensor is disposed on a motion sensor circuit board connected to the motion sensor module plate, and wherein the motion sensor module plate comprises a seal for the motion sensor module.

12. A method of providing hysteretic power factor correction (PFC) start up for a LED luminaire, the method comprising:
(i) with the output current of the PFC stage at zero, and with the Buck regulator in an off condition, causing the PFC stage to turn on and begin to charge a boost capacitor;
(ii) when a desired high fixed voltage across the boost capacitor is reached, turning off the Buck regulator at a low current value and turning off the PFC stage allowing the boost capacitor to discharge to a lower fixed voltage as it supplies current to the LED luminaire;
(iii) adjusting a ramp-up voltage time, between the lower fixed voltage and the high fixed voltage, to equal a ramp-down voltage time between the high fixed and the lower fixed voltage; and
(iv) turning the PFC stage back on.

* * * * *